United States Patent
Samuel et al.

(10) Patent No.: US 12,061,803 B2
(45) Date of Patent: Aug. 13, 2024

(54) SYSTEM WITH INCREASING PROTECTED STORAGE AREA AND ERASE PROTECTION

(71) Applicant: Microchip Technology Incorporated, Chandler, AZ (US)

(72) Inventors: Roshan Samuel, Chandler, AZ (US); Erick Pfeifer, Cedar Park, TX (US); John Day, Marlborough, MA (US); Daniel Ujvari, Hauppauge, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/499,167

(22) Filed: Oct. 12, 2021

(65) Prior Publication Data
US 2022/0113879 A1 Apr. 14, 2022

Related U.S. Application Data

(60) Provisional application No. 63/091,333, filed on Oct. 14, 2020.

(51) Int. Cl.
*G06F 3/06* (2006.01)

(52) U.S. Cl.
CPC .......... *G06F 3/0623* (2013.01); *G06F 3/0604* (2013.01); *G06F 3/0652* (2013.01); *G06F 3/0659* (2013.01); *G06F 3/0679* (2013.01)

(58) Field of Classification Search
CPC .... G06F 3/0623; G06F 3/0604; G06F 3/0652; G06F 3/0659; G06F 3/0679
See application file for complete search history.

(56) References Cited

U.S. PATENT DOCUMENTS

| | | | | |
|---|---|---|---|---|
| 5,329,618 | A | * 7/1994 | Moati | H04L 12/4625 709/245 |
| 5,363,334 | A | * 11/1994 | Alexander | G11C 16/22 365/185.11 |
| 6,034,889 | A | 3/2000 | Mani et al. | 365/185.04 |
| 6,728,830 | B1 | 4/2004 | Assaf | 711/112 |
| 2005/0080999 | A1* | 4/2005 | Angsmark | G06F 12/1441 711/151 |
| 2005/0273550 | A1* | 12/2005 | Chevallier | G06F 12/1433 711/E12.1 |
| 2008/0250509 | A1* | 10/2008 | Ahvenainen | G06F 12/1441 726/34 |

(Continued)

FOREIGN PATENT DOCUMENTS

FR 2770327 A1 4/1999 ............. G06F 12/14

OTHER PUBLICATIONS

International Search Report and Written Opinion, Application No. PCT/US2021/054754, 11 pages, Feb. 10, 2022.

*Primary Examiner* — Nanci N Wong
(74) *Attorney, Agent, or Firm* — SLAYDEN GRUBERT BEARD PLLC

(57) ABSTRACT

An apparatus may include a processor. The apparatus may include a memory communicatively coupled to the processor. The apparatus may include a memory control circuit (MCC). The MCC may be configured to define a protected portion of the memory, wherein the protected portion of the memory is configured for read-only access by the processor, increase a size of the protected portion of the memory, and, after the increase in size of the protected portion of the memory, prevent decreases of the size of the protected portion of the memory.

20 Claims, 4 Drawing Sheets

(56) References Cited

U.S. PATENT DOCUMENTS

| | | | |
|---|---|---|---|
| 2014/0089561 A1 | 3/2014 | Pangal et al. | 711/103 |
| 2015/0363126 A1* | 12/2015 | Frick | G06F 3/0634 |
| | | | 711/114 |
| 2016/0070656 A1 | 3/2016 | Babu et al. | 711/163 |
| 2017/0372088 A1 | 12/2017 | Zhao et al. | |
| 2019/0236281 A1* | 8/2019 | Hershman | G06F 21/85 |
| 2021/0043269 A1* | 2/2021 | He | G11C 29/802 |
| 2021/0266148 A1* | 8/2021 | Tsirkin | H04L 9/0894 |

* cited by examiner

SYSTEM WITH INCREASING PROTECTED STORAGE AREA AND ERASE PROTECTION

PRIORITY

This application claims priority to U.S. Provisional Patent Application No. 63/091,333 filed Oct. 14, 2020, the contents of which are hereby incorporated in their entirety.

FIELD OF THE INVENTION

The present disclosure relates to computing and, more particularly, to system with increasing protected storage area and erase protection.

BACKGROUND

Existing microcontrollers may use flash memory in several ways. Flash memory may be used for application data, wherein software running on processors on the microcontroller may allocate and release portions of the memory for various real-time usage. Flash memory may be used to store boot code or other boot data. Moreover, flash memory may be used to store other data in a more persistent manner. This may be referred to as a storage area flash (SAF) block.

Users may wish to make data in the SAF block persistent so that it is available to different software of the microcontroller over time. For example, serial numbers, calibration data, allow users or software to set aside areas in flash memory for storage. Some microcontrollers may offer the ability to write-protect this area. However, inventors of examples of the present disclosure have discovered that the ability to write-protect such an area may be limited. The write protections themselves may be prone to being reversed. Furthermore, irreversible write protections do not allow for accommodating additional data that may be added later, wherein the user wishes to write-protect such additional data. Examples of the present disclosure may address one or more of these shortcomings of other solutions.

SUMMARY

Examples of the present disclosure may include an apparatus. The apparatus may include a processor. The apparatus may include a memory communicatively coupled to the processor. The apparatus may include a memory control circuit (MCC). The MCC may be configured to define a protected portion of the memory, wherein the protected portion of the memory is configured for read-only access by the processor, increase a size of the protected portion of the memory, and, after the increase in size of the protected portion of the memory, prevent decreases of the size of the protected portion of the memory.

Examples of the present disclosure may include a method. The method may include defining a protected portion of a memory communicatively coupled to a processor. The protected portion of the memory may be configured for read-only access by the processor. The method may include increasing a size of the protected portion of the memory. The method may include, after the increase in size of the protected portion of the memory, preventing decreases of the size of the protected portion of the memory

DETAILED DESCRIPTION

Figure 1:
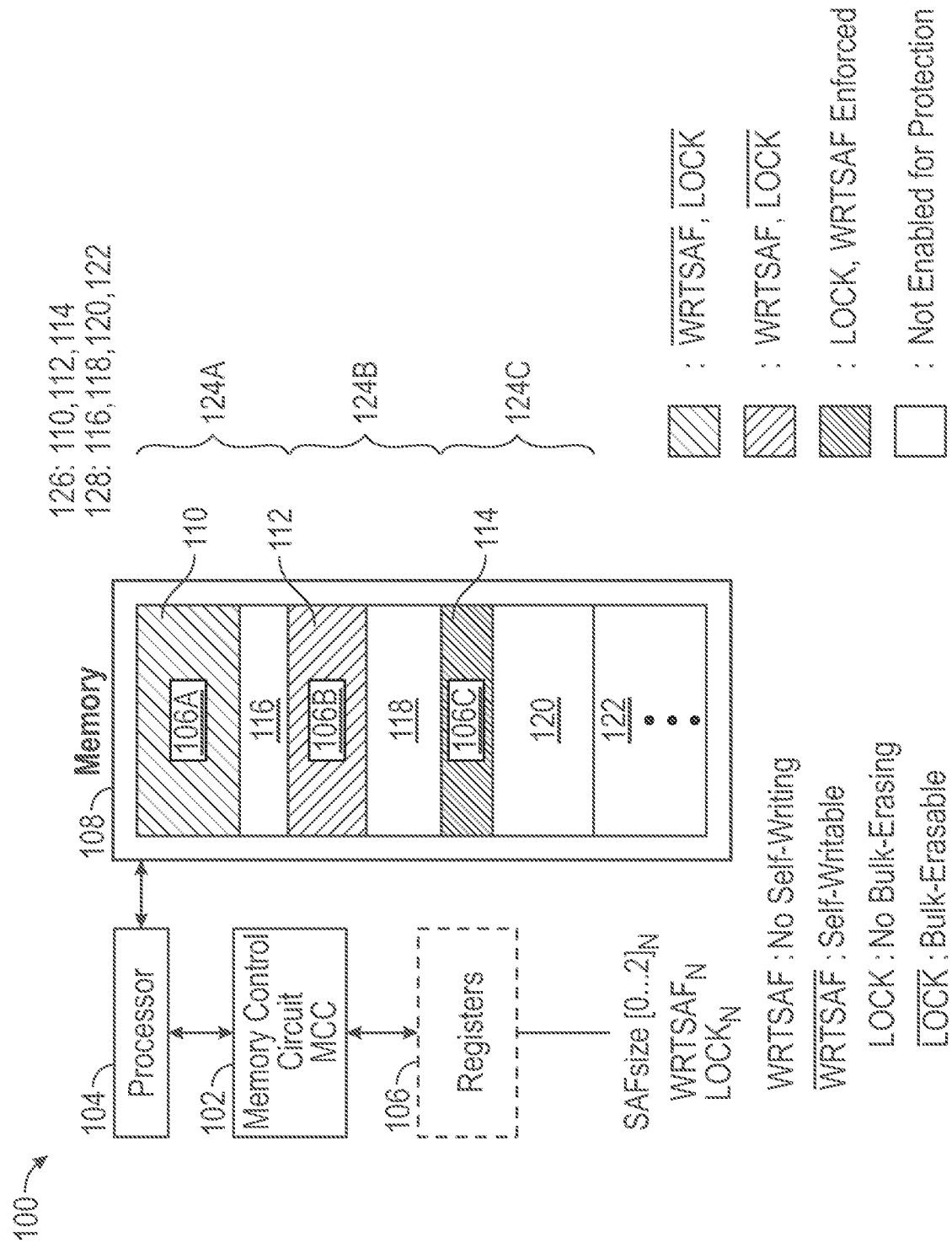
FIG. 1 is an illustration of an example system for increasing protected storage area, according to examples of the present disclosure.

Examples of the present disclosure may include an apparatus. The apparatus may include a processor. The apparatus may include a memory communicatively coupled to the processor. The apparatus may include a memory control circuit (MCC). The MCC may be implemented by analog circuitry, digital circuitry, instructions for execution by a processor, or any suitable combination thereof. The processor which may execute instructions of the MCC may be a same or a different processor than the processor that is communicatively coupled to the memory described above. The instructions for execution may be stored on a non-transitory memory, and the memory may be the same or different as the memory that is communicatively coupled to the processor described above. The MCC may be configured to define a protected portion of the memory. The protected portion of the memory may be configured for read-only access by the processor. The MCC may be configured to increase a size of the protected portion of the memory. The size may be increased by making more of the memory included within the protected portion. The MCC may be configured to, after the increase in size of the protected portion of the memory, prevent decreases of the size of the protected portion of the memory. Protected memory may be used for any suitable purpose, such as immutable boot loader code, configuration data, or calibration data. Protected memory may be protected against any suitable action, such as against read operations, read operations from application memory or other designated memory locations, self-writes, or bulk erase operations.

In combination with any of the above examples, the MCC may be further configured to permanently prevent decrease of the size of the protected portion of the memory.

In combination with any of the above examples, the MCC may be further configured to permanently increase the size of the protected portion of the memory.

In combination with any of the above examples, the MCC may be further configured to, in order to increase the size of the protected portion of the memory, write a value to a fuse of the designation of address ranges of the protected portion of the memory, the value to change a default value.

In combination with any of the above examples, the MCC may be further configured to write a value to a fuse of the designation of address ranges of the protected portion of the memory based on a setting to designate a type of read-only behavior.

In combination with any of the above examples, the setting may be further to indicate that a bulk erase is not allowed.

In combination with any of the above examples, the MCC may be further configured to, based on the setting, prevent changes to the setting.

In combination with any of the above examples, the MCC may be further configured to, based on the setting, prevent writes to the protected portion of the memory.

In combination with any of the above examples, a designation that a given memory location is protected against bulk erase may take priority or precedence over a designation that the given memory is protected against self-writes. Thus, if the given memory is protected against bulk erase, then the given memory might be protected against self-writes by default, and without regard to any designation that self-writes are allowed.

FIG. 1 is an illustration of an example system 100 for increasing protected storage area, according to examples of the present disclosure. System 100 may include or be embodied by a processor, microcontroller, control circuit, or any other suitable device. Furthermore, system 100 may include a memory. The memory may include a protected storage area. The system may be configured to provide erase protection for the protected storage area. Furthermore, in one example, the device may be configured to increase a portion of the memory dedicated to the protected storage area. In one example, while the device may be configured to increase a portion of the memory dedicated to the protected storage area, the device and the memory may be configured to prevent the portion of the memory dedicated to the protected storage area from being decreased. Thus, the protected storage area may be increased, but not decreased, in size.

For example, system 100 may include a processor 104 and a memory 108. Processor 104 and memory 108 may be implemented in any suitable manner. For example, processor 104 may include a processor of a microcontroller. Memory 108 may include flash memory. Processor 104 may be configured to read data elements from memory 108. Moreover, processor 104 may be configured to write data elements to memory 108. However, the ability to write to particular portions of memory 108 may be controlled by a suitable element of system 100. For example, system 100 may include a memory control circuit (MCC) 102.

MCC 102 may be implemented by analog circuitry, digital circuitry, instructions for execution by a processor (such as processor 104), or any suitable combination thereof. MCC 102 may be configured to control allocation of a memory, such as memory 108, for storage. MCC 102 may be communicatively coupled to or included within processor 104. Moreover, MCC 102 may be communicatively coupled to any suitable number and kind of registers 106. Although shown implemented as a register, registers 106 may be implemented in any suitable memory, fuse, or other suitable storage mechanism. MCC 102 may be configured to read registers 106 or set registers 106. Processor 104 may also be configured to read or set registers 106. Registers 106 may be implemented within any suitable portion of system 100, such as within memory 108.

Memory 108 is illustrated as logically divided into different blocks 124 of memory 108. Although example divisions of memory 108 into blocks are shown, memory 108 may be divided into any suitable number and kind of blocks. In one example, memory 108 may be divided into different blocks 124 such that MCC 102 may configured to define portions of blocks 124 that are to be reserved for protected storage. However, portions of memory 108 may be reserved for protected storage in any suitable manner. Moreover, portions of memory 108, such as block 122, may represent those portions of memory 108 that are not configured to be reserved for protected storage by MCC 102 in the same manner that portions of blocks 124 might be reserved. Block 122, as well as portions of blocks 124 unreserved for protected storage, may be used for any suitable purpose of system 100.

Portions of memory 108 reserved for protected storage in the example of FIG. 1 may include portions 110, 112, 114. Each of portions 110, 112, 114 may represent a portion of blocks 124A, 124B, 124C, respectively, reserved for protected storage. Moreover, portions of memory 108 not reserved for protected storage in the example of FIG. 1 may include portions 116, 118, 120, 122. Each of portions 116, 118, 120 may represent a portion of blocks 124A, 124B, 124C, respectively, that are not reserved for protected storage. In one example, the size of one or more of portions 110, 112, 114 may be expanded to include additional memory addresses, thus increasing the size of memory reserved for protected storage. In another example, the size of block 114 may be prevented from being reduced, even though it may be expanded. In yet another example, the size of one or more of portions 110, 112, 114 may be expanded and the size of one or more of portions 116, 118, 120, respectively, may be reduced. Thus, expansion of memory reserved for protected storage within a memory block may be performed at the expense of counterpart memory not reserved for protected storage within the same memory block. Protected storage in FIG. 1 may be illustrated by storage area 126, including portions 110, 112, 114. Unprotected storage in FIG. 1 may be illustrated by storage area 128, including portions 116, 118, 120, 122.

Portions of memory 108 reserved for protected storage as storage area 128 may be reserved for any suitable purpose. For example, memory 108 may include any information that might be placed within a read-only memory (ROM). Memory 108 may include, for example, immutable boot loader code, configuration data, or calibration data. MCC may be configured to expand storage area 126 to accommodate additional data needed for such uses.

Portions of memory 108 may be reserved for protected storage in storage area 126 in any suitable manner. For example, portions of memory 108 may be marked as read-only to be included in protected storage in storage area 126. Furthermore, portions of memory 108 may be marked as read-only in any suitable manner. For example, portions of memory 108 may be marked as read-only through a designation preventing bulk erase operations, self-write operations, or read operations from a given other portion of memory. Setting of portions of memory 108 in various read-only modes may be made by MCC 102. Moreover, enforcement of such settings may be made by MCC 102. The modes may be set by writing to values in registers 106. Moreover, instances of such settings may be manifested in registers 106 for associated instances of blocks 124.

In one example, portions of memory 108 may be reserved for protected storage in storage area 126 by allowing memory addresses to be marked as unavailable for bulk erase operations. Such bulk erase operations may be made by an external programmer. The ability of a portion of memory 108 to be designated as unavailable for bulk erase may be given as LOCK. When LOCK is a logic high or "1", then a corresponding portion of memory 108 may be unavailable for bulk erase. When LOCK is a logic low or "0", then a corresponding portion of memory 108 may be available for bulk erase. LOCK may be expressed in the negative, as $\overline{LOCK}$. Thus, when $\overline{LOCK}$ is a logic low or "0", then a corresponding portion of memory 108 may be unavailable for bulk erase. When $\overline{LOCK}$ is a logic high or "1", then a corresponding portion of memory 108 may be available for bulk erase. Moreover, the reverse may be implemented, wherein when $\overline{LOCK}$ is a logic low or "0", then a corresponding portion of memory 108 may be available for bulk erase and when $\overline{LOCK}$ is a logic high or "1", then a corresponding portion of memory 108 may be unavailable for bulk erase. The LOCK or $\overline{\text{LOCK}}$ value may be stored in registers 106. Moreover, an instance of a register for LOCK or $\overline{\text{LOCK}}$ may exist for each block 124 of memory 108 to designate the given block 124 as available or unavailable for bulk erase. The LOCK or $\overline{\text{LOCK}}$ value may be stored as, for example, a fuse. By implementation by a fuse, by default memory locations may be designated as bulk-erasable, but when changed to be non-bulk-erasable, the change may be permanent and irreversible. When a bulk erase occurs, the fuses implementing LOCK or $\overline{\text{LOCK}}$ might otherwise be set to "1". A portion of memory storing the LOCK or $\overline{\text{LOCK}}$ values may itself be protected against bulk erase.

In another example, portions of memory 108 may be reserved for protected storage in storage area 126 by allowing memory addresses to be marked as unavailable for self-write operations. Such self-write operations may include software running from a block of memory reserved for protected storage being forbidden from writing to the same block of memory, or for any such edits within system 100. The ability of a portion of memory 108 to be designated as unavailable for self-write operations may be given as WRTSAF. When WRTSAF is a logic high or "1", then a corresponding portion of memory 108 may be unavailable for self-write operations. When $\overline{\text{WRTSAF}}$ is a logic low or "0", then a corresponding portion of memory 108 may be available for self-write operations. WRTSAF may be expressed in the negative, as $\overline{\text{WRTSAF}}$. When $\overline{\text{WRTSAF}}$ is a logic low or "0", then a corresponding portion of memory 108 may be available for self-write operations. When $\overline{\text{WRTSAF}}$ is a logic high or "1", then a corresponding portion of memory 108 may be available for self-write operations. Moreover, the reverse may be implemented, wherein when $\overline{\text{WRTSAF}}$ is a logic low or "0", then a corresponding portion of memory 108 may be unavailable for self-write operations and when $\overline{\text{WRTSAF}}$ is a logic high or "1", then a corresponding portion of memory 108 may be available for self-write operations. The WRTSAF or $\overline{\text{WRTSAF}}$ value may be stored in registers 106. Moreover, an instance of a register for WRTSAF or $\overline{\text{WRTSAF}}$ may exist for each block 124 of memory 108 to designate the given block 124 as available or unavailable for self-write operations. The WRTSAF or $\overline{\text{WRTSAF}}$ value may be stored as, for example, a fuse. By implementation by a fuse, by default memory locations may be designated as self-write-able, but when changed to be non-self-writeable, the change may be permanent and irreversible.

In various examples, portions of memory 108 may be reserved for protected storage in storage area 126 by allowing memory addresses to marked as, for example, unreadable from certain other flash memory locations. For example, some memory addresses may be marked as unreadable from code executing in an application area. This may be used, for example, to allow bootloader and other specific code to be able to read stored keys, but without allowing other applications to read the keys.

In one example, for a given memory location, LOCK may take precedence over WRTSAF. For example, when registers 106 specify that LOCK designates that bulk erase is not available, then self-writes might also not be available by default, regardless of the designation of WRTSAF. When the LOCK designates that bulk erase is available, the availability of self-writes might be specified by WRTSAF. Furthermore, any suitable other designations, as well as combinations of such designations with LOCK and WRTSAF, may be used for additional methods of enforcing read-only behavior on protected areas of memory 108.

As discussed above, the LOCK and WRTSAF designations may be made in registers 106 for a given memory location, address, or block. For example, an instance of LOCK and WRTSAF may be provided in registers 106 for each of blocks 124. Moreover, in one example, registers 106 may include a SAFSIZE register or designation for each block 124 for which designates what portions of the respective block 124 are to be reserved for protected storage in storage area 126. SAFSIZE may designate a range of addresses which are to be in a protected portion of memory. The specific way storage is protected in the respective block 124 may be provided by WRTSAF and LOCK. The SAFSIZE designation may be implemented in anu suitable manner, such as by three bits. The three bits may define addresses or other designations of portions of a given block 124 that is to be protected. Thus, for each of a quantity N different memory blocks 124, there may be a corresponding SAFSIZE[0 . . . 2]N, WRTSAF$_N$, and LOCK$_N$ register or designation.

In the example shown in FIG. 1, the ability to enable or disable bulk erase and self-writes may be expressed by the negative representation of the designations, LOCK and WRTSAF. This may result from an implementation wherein a "1" or "0" might be programmable as bits in registers 106 and blocks 124, but a "0" might be optionally, permanently assignable for such a bit. For example, the bit for a given LOCK designation may be implemented as a fuse that is by default a "1" value, but when a "0" is written to such bit, it is permanent. In other implementations wherein a fuse is implemented but the bits are by default a "0" value, but when a "1" is written to such a bit then it is permanent, the positive representations of LOCK and WRTSAF may be used to express the ability to enable or disable bulk erase and self-writes.

As discussed above, the WRTSAFN and LOCKN registers or designations may define how the corresponding portion of block 124N is to be protected. In one example, the WRTSAF$_N$ and LOCK$_N$ registers or designations may further define how the WRTSAF$_N$ and LOCK$_N$ registers or designations are themselves protected.

For example, block 124A may include a portion 110 that is not protected against self-writes and that is not protected against bulk erase, designated by $\overline{\text{LOCK}}$ and $\overline{\text{WRTSAF}}$. Portion 110 can be self-written and can be bulk erased. The size of portion 110 within block 124A may be designated by SAFSIZE. The portion of block 124A that is not designated by SAF SIZE as part of portion 110 may be shown as portion 116. Moreover, the register values of LOCK, WRTSAF, and SAF SIZE for block 124A may also be self-written and be bulk erased. Thus, register 106A including these designations is shown within portion 110. Register 106A may have the same protections as the memory (block 124A) designated by register 106A. Register 106A is shown as within portion 110 for the understanding of the reader as to this relationship, but register 106A may be implemented within portion 110 or elsewhere.

Block 124B may include a portion 112 that is protected against self-writes and that is not protected against bulk erase, designated by $\overline{\text{LOCK}}$ and WRTSAF. Portion 112 cannot be self-written but may be bulk erased. The size of portion 112 within block 124B may be designated by SAF SIZE. The portion of block 124B that is not designated by SAF SIZE as part of portion 112 may be shown as portion 118. Moreover, the register values of LOCK, WRTSAF, and SAFSIZE for block 124B may also be bulk erased but not self-written. Thus, register 106B including these designations is shown within portion 112. Register 106B may have the same protections as the memory (block 124B) designated by register 106B. Register 106B is shown as within portion 112 for the understanding of the reader as to this relationship, but register 106B may be implemented within portion 112 or elsewhere.

Block 124C may include a portion 114 that is protected against self-writes and that is not protected against bulk erase, designated by LOCK. The designation of WRTSAF may be disregarded in view of the designation of LOCK. Portion 114 cannot be self-written or be bulk erased. The size of portion 114 within block 124C may be designated by SAFSIZE. The portion of block 124C that is not designated by SAFSIZE as part of portion 114 may be shown as portion 120. Moreover, the register values of LOCK, WRTSAF, and SAFSIZE for block 124C may also be neither bulk-erased nor self-written. Thus, register 106C including these designations is shown within portion 114. Register 106C may have the same protections as the memory (block 124C) designated by register 106C. Register 106C is shown as within portion 114 for the understanding of the reader as to this relationship, but register 106C may be implemented within portion 114 or elsewhere.

However, in one example, memory locations or registers for SAFSIZE and LOCK, when LOCK is enabled, may be implemented as program-only bits without the capability to undo the write, or to write a different value. Once a bit is written, its value cannot be changed. As discussed above, various implementations may thus consider whether a default value is a "0" or a "1", and based upon that default value, selectively write the other value to permanently assign the value. If a default value is a "1", then the designation of LOCK in a register may actually be $\overline{\text{LOCK}}$. That is, because enabling LOCK cannot be undone, and the default values in the system are set as values of "1", enabling or disabling LOCK may be done through setting a register value for $\overline{\text{LOCK}}$. When $\overline{\text{LOCK}}$ is "1", by default, LOCK might not be enabled. When LOCK is enabled, irreversibly, $\overline{\text{LOCK}}$ is changed to "0".

Designations for SAF SIZE may similarly account for default values of bits in the system. When LOCK is enabled, SAFSIZE may be configured to be written, but once a bit of SAFSIZE is written, it cannot be undone. Thus, SAFSIZE may be configured to, as bits are written, increase a corresponding protected area of memory (such as a corresponding one of portions 110, 112, 114). However, as LOCK is enabled and SAFSIZE writes cannot be undone, the corresponding protected areas of memory may be increased, but not decreased. Again, as LOCK itself is prevented from being unenabled once enabled, the bits of SAFSIZE are prevented from being changed once written. Furthermore, as discussed above, once a portion of memory 108 is designated as a protected area of memory (such as a corresponding one of portions 110, 1112, 114), then the contents may be protected according to the settings of LOCK and WRTSAF from bulk erase or self-writes.

Users of system 100 may utilize this capability in any suitable manner. For example, after system 100 has been manufactured and deployed for use, portions of system 100 may be calibrated or recalibrated. It may be useful to prevent such calibration data from being overwritten. Even if new calibration data is later determined, erasure of the existing calibration data may be prevented to provide forensic analysis of the operation of system 100. In another example, as system 100 is created and deployed through a supply chain, resellers, incorporated into larger systems, etc., different serial numbers may be added to identify system 100 in different contexts. The existing serial numbers might be prevented from erasure, even if further identifying information is added to system 100. In yet another example, as system 100 performs various tasks, the tasks may be recorded in a block chain. As a task is performed, the task may be validated or authenticated and added to an existing record as a new leaf in a block chain. Erasure of the entire block chain, new and old portions, may be prevented. In still yet another example, system 100 may require additional cryptographic keys or credentials. The new keys or credentials may be added to system 100 in a read-only manner, while existing keys or credentials are not overwritten. In still yet another example, bits designated a boot area of memory 108 may be included in the In each of these examples, protected areas of memory (such as portions 110, 112, 114) may be increased so that such additional information may be stored in a read-only manner. The data to be added may be written to an unprotected area of memory (such as portions 116, 118, 120), and then MCC 102 may be configured to redesignate part of the respective block 124 as a protected area of memory.

For example, MCC 102 may be configured to determine that a new cryptographic key is to be written to memory 108 in a read-only manner. MCC 102 may cause the new cryptographic key to be written to portion 120 in block 124C. Then, MCC 102 may write additional values to the SAF SIZE designation for block 124C causing the addresses wherein the new cryptographic key to be now a part of portion 114 rather than portion 120. As LOCK is enabled for portion 114, this might not be reversible.

Moreover, until an unprotected area of memory 108 (such as portions 116, 118, 120) is designated as a protected area of memory 108 (such as portions 110, 112, 114), the unprotected area of memory 108 may be used in any other suitable manner by system 100. Contents may be read, written, and erased as needed. Thus, system 100 may provide flexibility to users for read-only data as it is needed.

Registers 106 may include any other suitable data that, when LOCK is enabled, prevent rewriting. For example, registers 106 may include designations of boot code address or memory allocated for such boot code. MCC 102 may cause the address or size of the boot code to be written in an unprotected area of memory 108 (such as portion 120), then enable LOCK for the written data (by expanding, for example, portion 114). In another example, registers 106 may include a designation of whether external writers or programmers, such as those for in-circuit serial programming (ICSP), are allowed. Once such a designation is disabled by, for example, writing a "0" to a register bit, the designation may be made permanent by MCC 102 enabling LOCK for a location of the written bit. This may be used, for example, to deploy system 100 securely such that external programmers cannot further access its contents.

Figure 2:
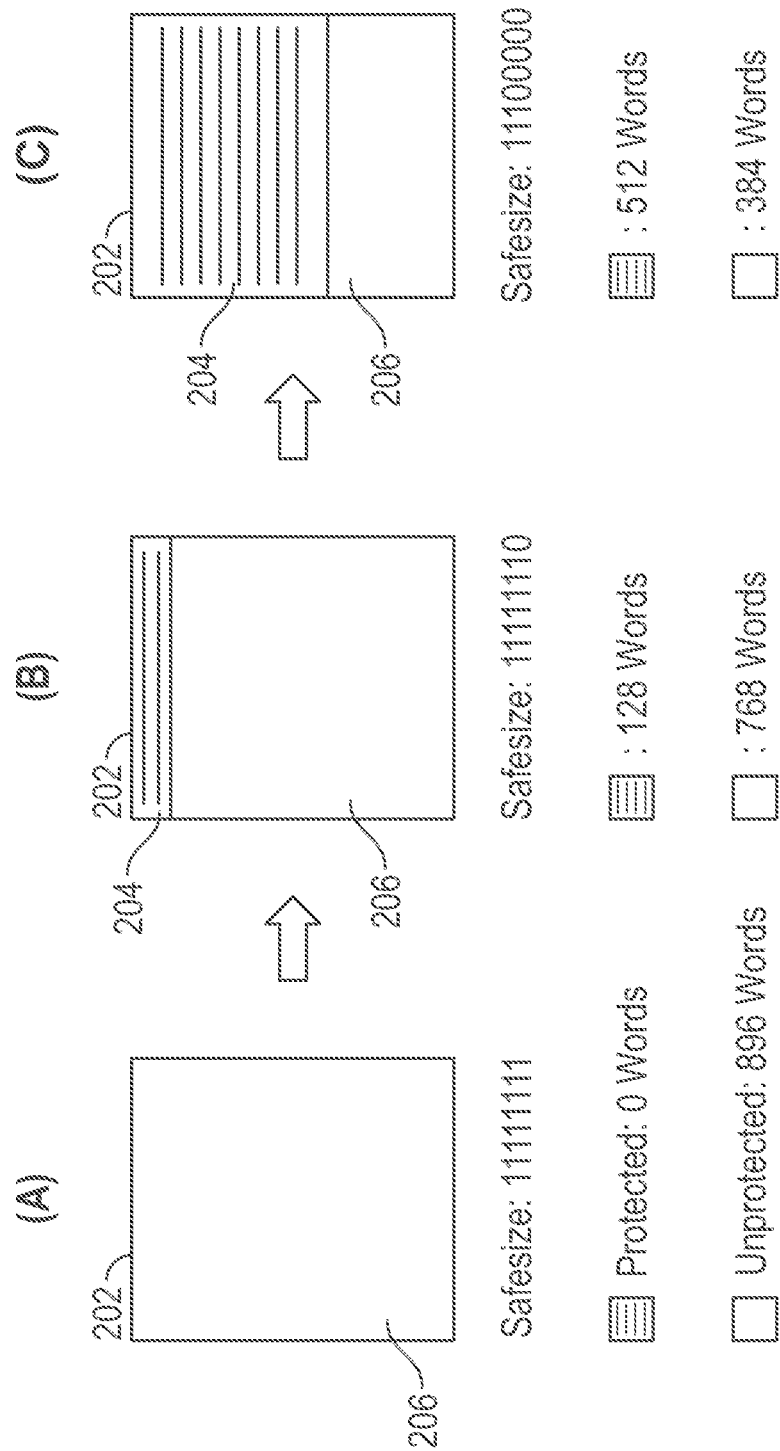
FIG. 2 is an illustration of increasing protected storage area in the system, according to examples of the present disclosure.

FIG. 2 is an illustration of increasing protected storage area in system 100, according to examples of the present disclosure. Shown in FIG. 2 is a block 202 of memory with portions 204, 206. Block 202 may implement any suitable one of blocks 124 of FIG. 1. Portion 204 may implement any suitable one of portions 110, 112, 114 of FIG. 1. Portion 206 may implement any suitable one of portions 116, 118, 120 of FIG. 1.

In (A), there might not be any protected portion of block 202. Thus, portion 204 may be empty or non-existent. Portion 206 may occupy the entirety of block 202. Block 202 may be, for example, 896 words in size. The SAFSIZE designation for this arrangement may be, for example, {1111 1111}.

In (B), there may be both protected and unprotected portions of block 202. Portion 204 may include 128 words. Portion 206 may include 768 words. The SAFSIZE designation for this arrangement may be, for example, {1111 111}. Thus, by changing the last bit of SAFSIZE from a "1" to a "0", 128 words may have been reallocated from portion 206 to portion 204.

Portion 204 may occupy the first 128 words of block 202 or may occupy the last 128 words of block 202. Similarly, portion 206 may occupy the last 768 words of block 202 or may occupy the first 768 words of block 202.

In (C), there may be both protected and unprotected portions of block 202. Portion 204 may include 512 words. Portion 206 may include 384 words. The SAFSIZE designation for this arrangement may be, for example, {1110 0000}. Thus, by changing three additional bits of SAFSIZE from a "1" to a "0", additional words may have been reallocated from portion 206 to portion 204.

Although a particular manner of allocating between protected memory in portion 204 and unprotected memory in portion 206 is shown as above, any suitable allocation scheme may be used. By designating each bit of SAF SIZE as corresponding to an area of memory in block 202, the LOCK designation may be used to allow expansion of protected memory while preventing contraction of protected memory, as shown in further detail in FIG. 3.

Figure 3:
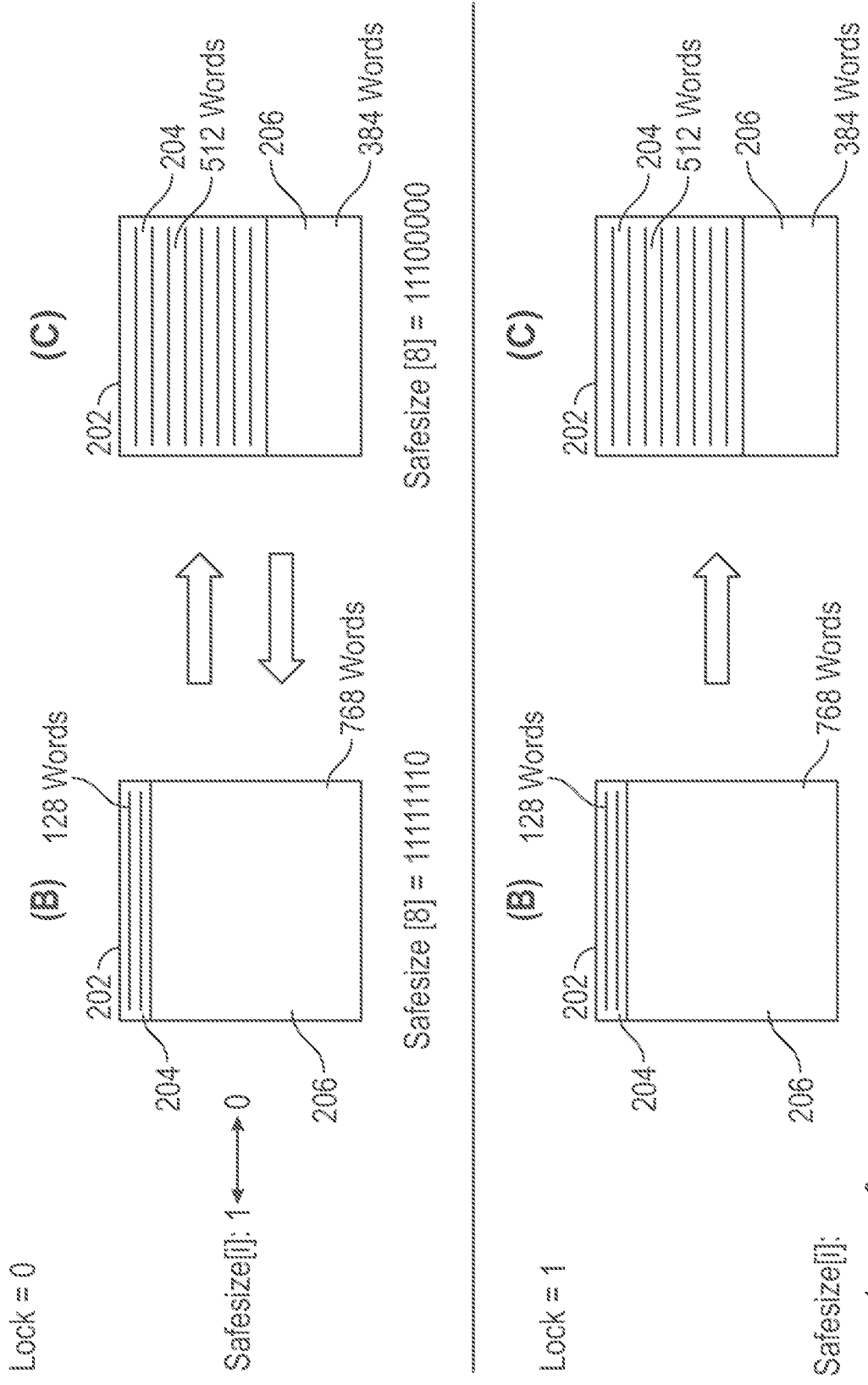
FIG. 3 is an illustration of how the system may increase but not decrease protected storage area in the system, according to examples of the present disclosure.

FIG. 3 is an illustration of how system 100 may increase but prevent decrease of protected storage area in the system, according to examples of the present disclosure. Using the same enumeration and elements of FIG. 2, two different scenarios are presented for changing allocation of protected and unprotected memory portions of block 202.

When LOCK is not enabled, a given bit of SAFSIZE (by default, a "1") may be written as a "0", and then subsequently rewritten as a "1", etc. Thus, comparing the status of block 202 in a transition from (B) to (C), by writing a "0" to the second, third, and fourth right-most bits of SAF SIZE, portion 204 is resized from the first 128 words of block 202 to the first 512 words of block 202. Moreover, when looking at the status of block 202 in a transition from (C) to (B), rewriting a "1" to the second, third, and fourth right-most bits of SAFSIZE, portion 204 is resized from the first 512 words of block 202 down to the first 128 words of block 202.

However, when LOCK is enabled, a given bit of SAF SIZE may be written as a "0", but not subsequently rewritten as a "1". The status of block 202 in a transition from (B) to (C) is shown by writing a "0" to the second, third, and fourth right-most bits of SAFSIZE. Portion 204 is resized from the first 128 words of block 202 to the first 512 words of block 202. However, there is no ability to transition back from (C) to (B). A rewrite of a "1" to the second, third, and fourth right-most bits of SAF SIZE is prevented. Portion 204 cannot be resized from the first 512 words of block 202 back down to the first 128 words of block 202.

Figure 4:
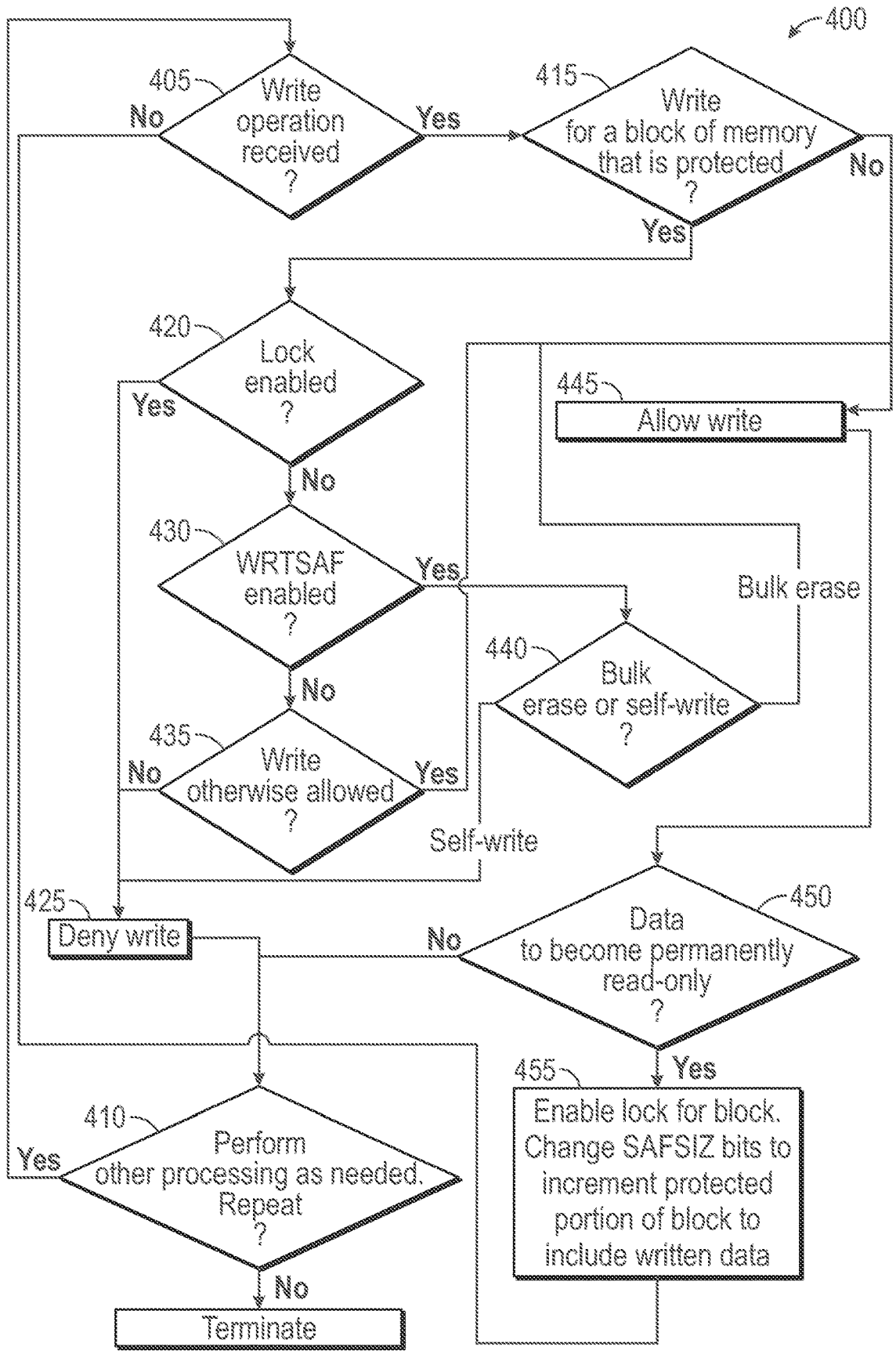
FIG. 4 is an example method for protecting storage areas in a memory, according to examples of the present disclosure.

FIG. 4 is an example method 400 for protecting storage areas in a memory, according to examples of the present disclosure. Method 400 may be performed by any suitable portion of system 100. In particular, method 400 may be performed by MCC 102. MCC 102 may perform method 400 on behalf of processor 102 and upon memory 108. Method 400 may include more or fewer steps than shown in FIG. 4. Steps of method 400 may be optionally repeated, omitted, performed in parallel or recursively, or in any suitable order. Method 400 may begin at any suitable step, such as step 405. Method 400 may optionally repeat, whether fully or in part.

At step 405, it may be determined whether a write operation has been received. If not, method 400 may proceed to step 410. If so, method 400 may proceed to step 415.

At step 410, other processing, such as processing unrelated to write operations or permissions, or processing related to write operations or permissions not otherwise addressed in method 400, may be performed. It may be determined whether method 400 is to repeat. If so, method 400 may return to step 405. Otherwise, method 400 may terminate.

At step 415, it may be determined whether the received write is for addresses in a block of data that is protected. If so, method 400 may proceed to step 420. Otherwise, method 400 may proceed to step 445.

At step 420, it may be determined whether a LOCK designation indicates that bulk erases are prevented or not to be performed for the address. If so, method 400 may proceed to step 425. Otherwise, method 400 may proceed to step 430.

At step 425, the write may be denied. Method 400 may proceed to step 410.

At step 430, it may be determined whether a WRTSAF designation indicates that self writes are prevented or not to be performed for the address. If so, method 400 may proceed to step 440. Otherwise, method 400 may proceed to step 435.

At step 435, it may be determined whether any other write permissions apply, and whether the write is otherwise allowed. If not, method 400 may proceed to step 425. Otherwise, method 400 may proceed to step 445.

At step 440, it may be determined whether the attempted write was a bulk erase or a self-write. If the attempted write was a self-write, this may be prevented by the WRTSAF designation and method 400 may proceed to step 425. If the attempted write was a bulk erase, this may be allowed by the LOCK designation and not prevented by the WRTSAF designation and method 400 may proceed to step 445.

At step 445, the write may be allowed.

At step 450, it may be determined whether the data that has been written as a result of step 445 is to become permanently read-only. If not, method 400 may proceed to step 410. Otherwise, method 400 may proceed to step 455.

At step 455, LOCK may be enabled for the block that was just written to. A designation of the protected portion of the block, such as SAFSIZE, may be edited to increment a protected area of the block to include the data that was written to as a result of step 445. Method 400 may proceed to step 410.

Although example examples have been described above, other variations and examples may be made from this disclosure without departing from the spirit and scope of these examples.

What is claimed is:

1. A method, comprising:
defining a protected portion as a subset of a memory block, the memory block including a contiguous set of memory addresses and communicatively coupled to a processor, wherein the protected portion of the memory block is configured for read-only access by the processor and the protected portion of the first memory block is a less than an entirety of the first memory block, wherein the read-only access includes a bulk erase setting and a self-write setting, the bulk erase setting of a higher precedence over the bulk erase setting;

increasing a size of the protected portion as the subset of the memory block;

after the increase in size of the protected portion as the subset of the memory block, preventing decreases of the size of the protected portion as the subset of the memory block;

in response to a determination that a bulk erase operation is allowed based on a first value stored in a first register, determining whether a self-write operation is allowed based on a second value stored in a second register; and in response to a determination that the bulk erase operation is not allowed based on the first value stored in the first register, determining that the self-write operation is not allowed regardless of the second value stored in the second register.

2. The method of claim 1, comprising permanently preventing decreasing the size of the protected portion as the subset of the memory block.

3. The method of claim 1, comprising permanently increasing the size of the protected portion as the subset of the memory block.

4. The method of claim 1, comprising, in order to increase the size of the protected portion as the subset of the memory block, writing a value to a fuse of the designation of address ranges of the protected portion as the subset of the memory block, the value to change a default value.

5. The method of claim 4, comprising writing the value to the fuse of the designation of address ranges of the protected portion as the subset of the memory block based on a setting to designate a type of read-only behavior, the type of read-only behavior is a single type among a plurality of possible read-only behaviors.

6. The method of claim 5, wherein the setting is to indicate that a bulk erase is not allowed, the bulk erase to include a command to completely erase one or more memory regions.

7. The method of claim 5, comprising, based on the setting, preventing changes to the setting.

8. The method of claim 5, comprising, based on the setting, preventing writes to the protected portion as the subset of the memory block.

9. The method of claim 1, wherein the protected portion as the subset of the memory block is configured for read-only access by the processor through an indication that self write operations are not allowed.

10. The method of claim 1, wherein the protected portion as the subset of the memory block is configured for protection access by the processor through an indication that read operations from a given memory address are not allowed.

11. An apparatus, comprising:
a processor;
a memory communicatively coupled to the processor, the memory including a plurality of memory blocks, the memory blocks including a contiguous set of memory addresses; and
a memory control circuit (MCC) to:
define a protected portion as a subset of a first memory block of the plurality of memory blocks, wherein the protected portion as the subset of the first memory block is configured for read-only access by the processor and the protected portion of the first memory block is less than an entirety of the first memory block;
increase a size of the protected portion as the subset of the first memory block;
after the increase in size of the protected portion as the subset of the first memory block, prevent decreases of the size of the protected portion as the subset of the first memory block;
in response to a determination that a bulk erase operation is allowed based on a first value stored in a first register, determine whether a self-write operation is allowed based on a second value stored in a second register; and
in response to a determination that the bulk erase operation is not allowed based on the first value stored in the first register, determine that the self-write operation is not allowed regardless of the second value stored in the second register.

12. The apparatus of claim 11, wherein the MCC is to permanently prevent decrease of the size of the protected portion as the subset of the first memory block.

13. The apparatus of claim 11, wherein the MCC is to permanently increase the size of the protected portion as the subset of the first memory block.

14. The apparatus of claim 11, wherein the MCC is to, in order to increase the size of the protected portion as the subset of the first memory block, write a value to a fuse of a designation of address ranges of the protected portion as the subset of the first memory block, the value to change a default value.

15. The apparatus of claim 14, wherein the MCC is to write the value to the fuse of the designation of address ranges of the protected portion as the subset of the first memory block based on a setting to designate a type of read-only behavior, the type of read-only behavior is a single type among a plurality of possible read-only behaviors.

16. The apparatus of claim 15, wherein the setting is to configure the protected portion as the subset of the first memory block for read-only access through an indication that a bulk erase is not allowed, the bulk erase to include a command to completely erase one or more memory regions.

17. The apparatus of claim 15, wherein the MCC is to, based on the setting, prevent changes to the setting.

18. The apparatus of claim 15, wherein the MCC is to, based on the setting, prevent writes to the protected portion as the subset of the first memory block.

19. The apparatus of claim 11, wherein the protected portion as the subset of the first memory block is configured for read-only access by the processor through an indication that self write operations are not allowed.

20. The apparatus of claim 11, wherein the protected portion as the subset of the first memory block is configured for protection by the processor through an indication that read operations from a given memory address are not allowed.

* * * * *